United States Patent
Lin

(10) Patent No.: US 9,481,558 B2
(45) Date of Patent: Nov. 1, 2016

(54) FUNNEL APPARATUS FOR FILLING OF LIQUIDS

(71) Applicant: SHOU KING ENTERPRISE CO., LTD., Taichung (TW)

(72) Inventor: Ching-Chou Lin, Taichung (TW)

(73) Assignee: SHOU KING ENTERPRISE CO., LTD., Taichung (TW)

( * ) Notice: Subject to any disclaimer, the term of this patent is extended or adjusted under 35 U.S.C. 154(b) by 404 days.

(21) Appl. No.: 13/939,290

(22) Filed: Jul. 11, 2013

(65) Prior Publication Data
US 2015/0013841 A1    Jan. 15, 2015

(51) Int. Cl.
*B67C 11/04*    (2006.01)
*F16K 1/36*    (2006.01)
*F16K 31/60*    (2006.01)
*B67C 11/00*    (2006.01)

(52) U.S. Cl.
CPC .............. *B67C 11/04* (2013.01); *F16K 1/36* (2013.01); *F16K 31/60* (2013.01); *B67C 2011/30* (2013.01)

(58) Field of Classification Search
CPC .............. B67C 11/04; B67C 2011/20; B67C 2011/025; B67C 11/00; B67C 2011/30
USPC ................ 141/331–345, 297–300, 363, 364; 73/294; 222/460–462
See application file for complete search history.

(56) References Cited

U.S. PATENT DOCUMENTS

| 194,887 | A | * | 9/1877 | Berg | 141/344 |
| 413,326 | A | * | 10/1889 | Magliola | 141/298 |
| 591,894 | A | * | 10/1897 | Sprain | 141/298 |
| 985,312 | A | * | 2/1911 | Woods | 141/298 |
| 989,113 | A | * | 4/1911 | Browne | 141/298 |
| 3,177,907 | A | * | 4/1965 | Baldi | B67C 11/04 141/300 |
| 2008/0099100 | A1 | * | 5/2008 | Ferguson | 141/340 |

FOREIGN PATENT DOCUMENTS

| DE | 2332359 | * | 1/1975 |
| FR | 687870 | * | 8/1930 |
| FR | 1082586 | * | 12/1954 |

* cited by examiner

*Primary Examiner* — Mark A Laurenzi
*Assistant Examiner* — Andrew StClair
(74) *Attorney, Agent, or Firm* — Raymond Y. Chan; David and Raymond Patent Firm

(57) ABSTRACT

The present invention relates to a funnel apparatus for filling of liquids, which comprises a funnel, a sealing means, a locking means, and a soft tube. The funnel apparatus has a fluid receiving member and a tubular member provided for carrying fluid. The latter has a passageway that has a top end portion installed with a handle, and a bottom end portion equipped with a stopper provided for blocking movement of the tubular member. The plunger rod has recessed portions patterned in a longitudinal orientation across its surface. The locking means has an assembly bore and a rim connected with a series of spokes; the assembly bore is fixedly disposed at an end of the receiving member so the plunger rod stretches over the assembly bore and can move axially thereby. The soft tube is inserted into the recessed portions on the plunger rod for providing an air exchange functionality.

4 Claims, 6 Drawing Sheets

FUNNEL APPARATUS FOR FILLING OF LIQUIDS

BACKGROUND OF THE INVENTION

1. Fields of the Invention

The present invention relates to a funnel apparatus used for filling liquids, such as anti-freeze liquid or liquid for heat exchangers, and more specifically, for filling of oil into automobiles' motor generator tanks, cooling agent and anti-freeze liquid for automobiles' heat radiators. The present invention provides one or more expedients and express ways for introducing and filling liquids into a specific container.

2. Descriptions of Related Art

One known prior art is U.S. Pat. No. 5,626,174, which comprises a funnel having a fluid receiving body and a tubular member adapted to extend to receive fluid therefrom; the tubular member is used to extend into the fill opening of the radiator of an automobile; and a stopper means having a stem, a plug portion integrally extending at one end thereof, and a handle integrally connected at the other end thereof, to close the bore through the spout of the funnel.

The function of the above-identified stopper is to close the tubular member, which translates to mean that when the fluid is at its fullest level inside the radiator after filling, and when the receiving body still has extra fluid, the stopper works to block the tubular member, in order to prevent fluid from proceeding to spill from the tubular member. The above-identified stopper is not fixedly connected to the funnel, this means there is a possibility that the stopper may be lost as a result of misplacement or insufficient care for storage. Furthermore, another problem with the prior art is that the tubular member of the funnel is not equipped with ventilating hole. As a consequence of this, when the receiving body of the funnel is fully filled with a fluid, the air content inside the automobile's radiator would not possibly and properly be released therefrom. This can lead to undesired hiccup or prolonged lead-time in introducing a fluid into the wished destination. For normal operation, the stopper would be required to be continually and repeatedly inserted into the tubular member, in order to make the air content inside the heat radiator to be released from the fluid.

SUMMARY OF THE INVENTION

The present invention presents a funnel apparatus for filling of liquid, comprising a funnel, a sealing member, a locking means, and a soft tube. The funnel has a fluid receiving body and a tubular member provided for carrying fluid. One end of the receiving body is disposed with a limiting portion, the limiting portion circles around the perimeter defined by the inner diameter of the receiving body, to fix a locking means hereto. The above-identified tubular member is intended to be fixed at the filling opening of the automobile, which has a top end portion and a bottom end portion that are used for allowing fluid from the receiving body to flow into the filling opening therethrough. In addition, the above-identified sealing member has a plunger rod, which has a top end and a bottom end, the top end integrally extends to be disposed with a handle, the bottom end is disposed with a stopper for blocking the tubular member, wherein the plunger rod has recessed portions patterned toward a longitudinal orientation thereon. The above-identified locking means has an assembly bore portion and a rim. The rim is connected to the assembly bore portion with a series of spokes. All of which are locked in at one end of the receiving member of the funnel, to allow the plunger rod of the sealing means to stretch over the assembly bore portion, and to be configured to move axially on the assembly bore portion. The above-identified soft tube passes through the recessed portion of the plunger rod, to provide an air ventilation functionality during fluid transport.

A main objective of the present invention is to construct the sealing means to be fixed inside the receiving member of the funnel, making it to be interposed onto the locking means while also preserving axial mobility for the sealing means within the perimeter penned by the inner diameter of the assembly bore portion of the locking means. Another objective of the present invention is to insert a soft tube through the plunger rod of the sealing means. The soft tube extends to reach the tubular member and passes out therefrom. This design choice eliminates the above-identified shortcomings. For one aspect, the sealing means is fixedly disposed in the funnel, so the issue of likelihood of losing a device part would be non-existent. As a means for providing air ventilation, the above-identified soft tube can facilitate a fluid to flow from a receiving body through a tubular member and ultimately be introduced smoothly into the filling opening of the radiator. In other words, when a fluid is introduced into the filling opening of the radiator, the air content inside the radiator is conducted to flow out by mediation with the soft tube. Having the structural benefit thereof, a circulatory mechanism is established, and the fluid can be smoothly introduced into the radiator.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 5-1 is an enlarged view of the plunger rod, showing an example for the situation when the stopper is pushing against the assembly bore portion.

DETAILED DESCRIPTION OF THE PREFERRED EMBODIMENT

Figure 1:
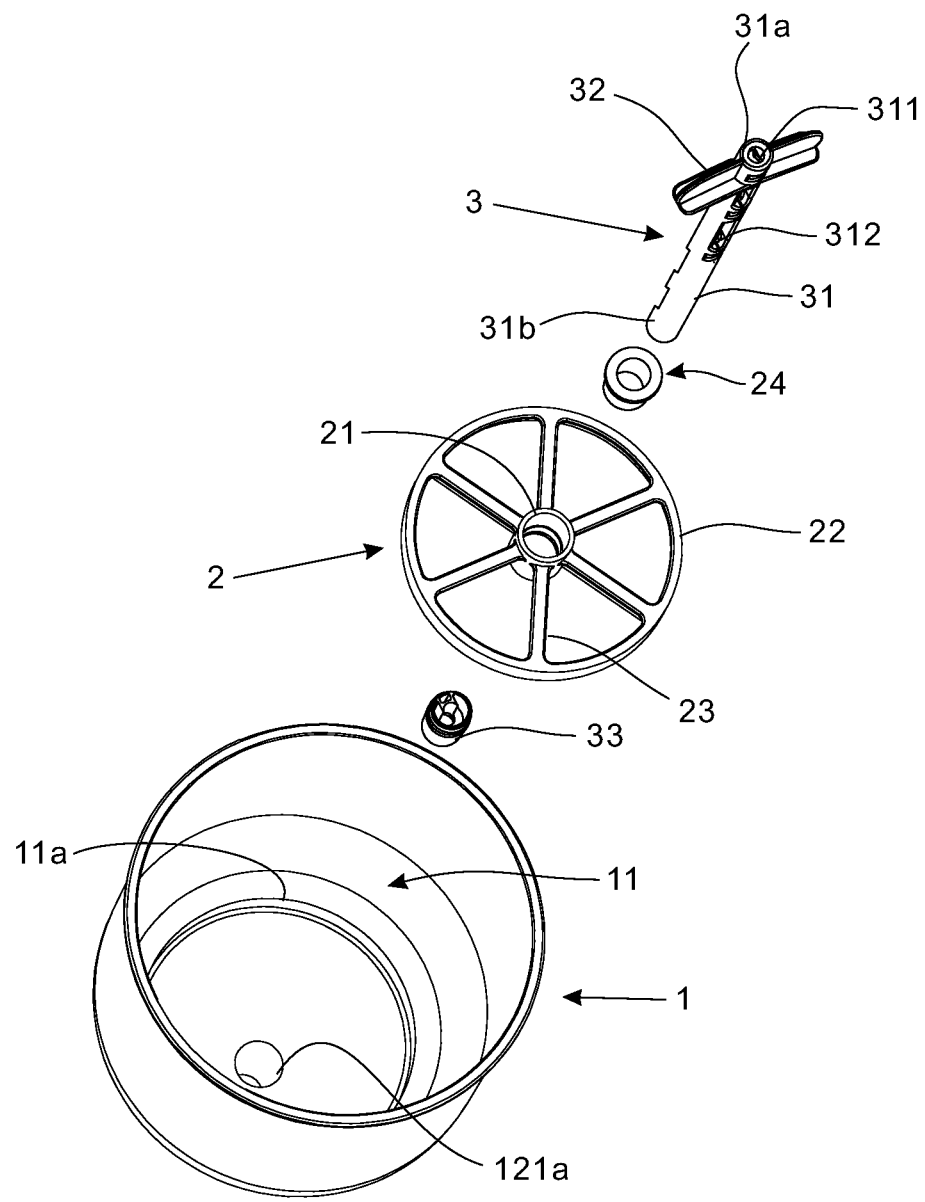
FIG. 1 is an exploded diagonal perspective of the funnel apparatus.
Figure 2:
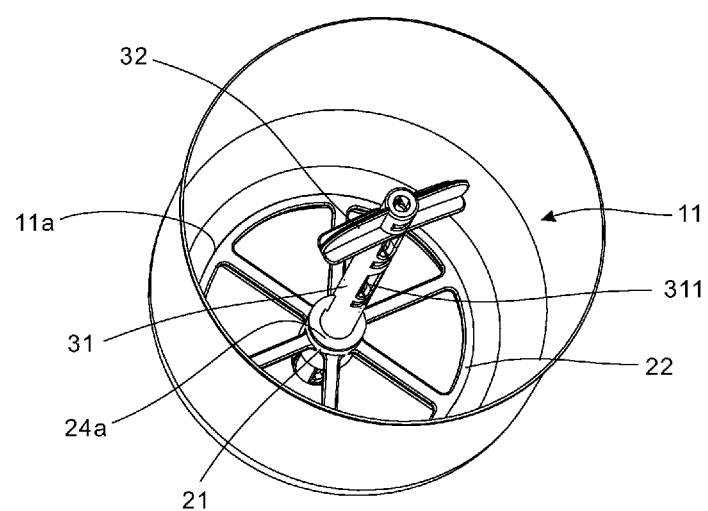
FIG. 2 shows an assembled diagonal perspective of the funnel apparatus.
Figure 3:
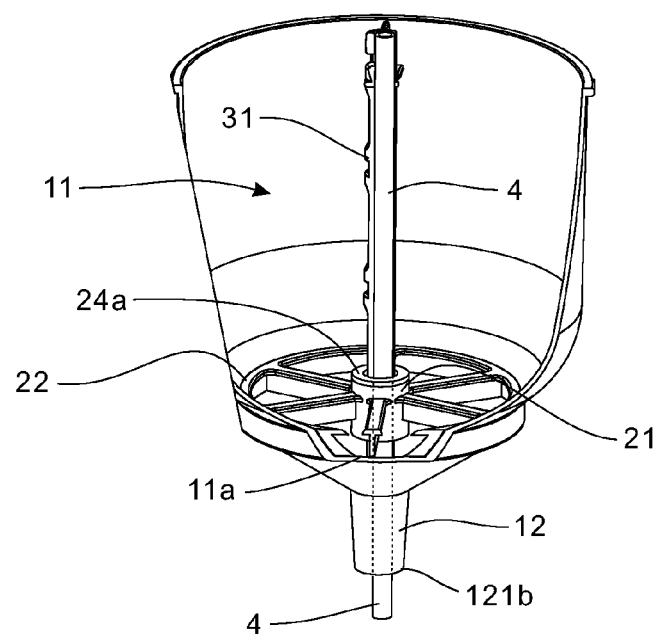
FIG. 3 is a cross-sectional view of the funnel apparatus along a Cartesian x-axis.
Figure 4:
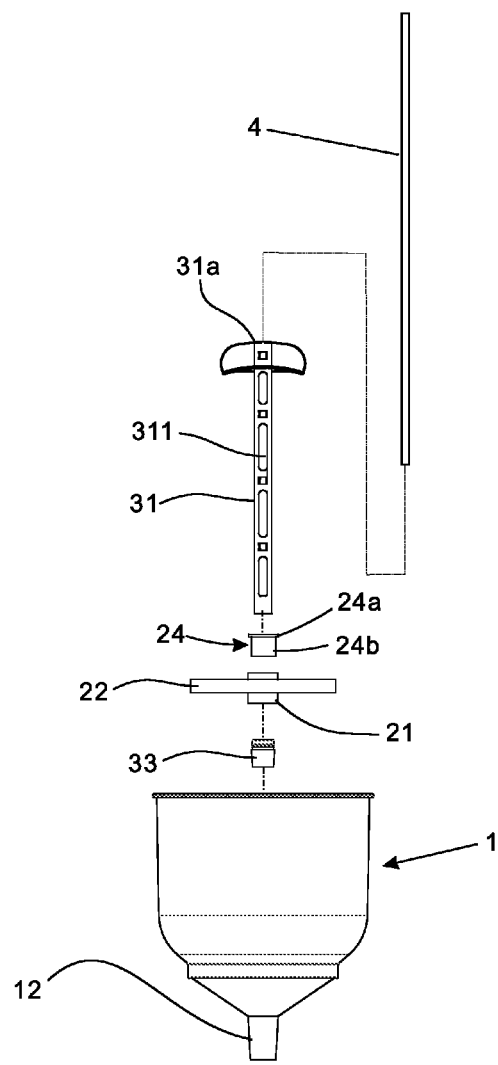
FIG. 4 is an exploded top perspective frontal view of the funnel apparatus.

In order to enable a person skilled in the relevant technology to practice the invention described in the specification, the objectives, technical features and effects will be further understood in connection with the Preferred Embodiments and in conjunction with the Drawings below. Further, the description presented below are not intended for use in limiting the technological scope of the present invention.

First, referring to the drawings in FIGS. 1 through 4, the assembled and exploded drawings for the funnel apparatus for filling of fluid of the present invention are presented, comprising a funnel 1, a locking means 2, a sealing means 3, and a soft tube 4. The funnel 1 has a fluid receiving member 11 and a tubular member 12 for passing fluid. One end of the receiving member 11 is disposed with a limiting portion 11a. The above-identified limiting portion 11a is configured to circle around the perimeter described by the inner diameter of the receiving member 11, to allow a locking means 2 to be fixedly locked hereto. The above-identified tubular member 12 is configured to be fixed at the filling opening 6 of the automobile, to allow the fluid be introduced from the receiving member 11 into the filling opening 6. The tubular member 12 has a top end portion 121a and a bottom end portion 121b.

The sealing means 3 has a plunger rod 31, the plunger rod 31 has recessed portions 311, slits 312, a handle 32 and a stopper 33. The above-identified recessed portions 311 are set to be formed in a longitudinal orientation along the body surface of the plunger rod 31. A top end 31a of the plunger rod 31 integrally extends to be disposed with a handle 32, to work as a facilitator in the form of a grip structure for aiding pulling or pressing during the axial movement of the sealing means 3. The bottom end 31b of the plunger rod 31 is disposed with a stopper 33, to serve in blocking the tubular member 12. The above-identified stopper is tightly attached onto the perimeter defined by the inner diameter of the bottom end 31b of the plunger rod 31. The plunger rod is equipped with holes and is designed to be matching with respect to the recessed portion 311 of the plunger rod 31. By way of the above, the soft tube 4 is provided to be inserted into the recessed portion 311 of the top end 31a of the plunger rod 31, passes through the stopper 33, extends to reach the tubular member 12, before passes out of the funnel 1 to be exposed a section of the soft tube 4, to work for ventilating air during fluid transport. The soft tube 4, having a long-strip shape, is inserted into the recessed portion 311 of the plunger rod 31 to pass through the stopper 33 to stretch toward the tubular member 12 before passing through the funnel to have a predetermined length of the soft tube 4 exposed. The slits 312 are disposed on the outer wall surface of the plunger rod 31 in a longitudinal orientation, which allows for the slits 312 to serve as an inspection tool for examining the soft tube 4 inserted in the recessed portion 311, such that the user can check to see whether the soft tube 4 is congestion-free.

The locking means 2 has an assembly bore portion 21 and a rim 22. The rim 22 is connected to the assembly bore portion 21 with a series of spokes 23. The rim 22 is fixedly locked onto the limiting portion 11a of the receiving member 11 of the funnel 1. The assembly bore portion 21 of the locking means 2 stretches over a connecting hub 24. An end of the connecting hub 24 has an extended lip 24a and the other end thereof has a tubing 24b. The extended lip 24a is configured to push against an end of the assembly bore portion 21, the tubing 24b is tightly attached to a perimeter defined by an inner diameter of the assembly bore portion 21, to allow for the bottom end 31b of the plunger rod 31 of the sealing means 3 to pass through the connecting hub 24 before the stopper 33 is tightly attached onto the bottom end 31b of the plunger rod 31. As a result of the above configuration, the plunger rod 31 can move in a direction co-axially to the locking means 2.

Figure 5:
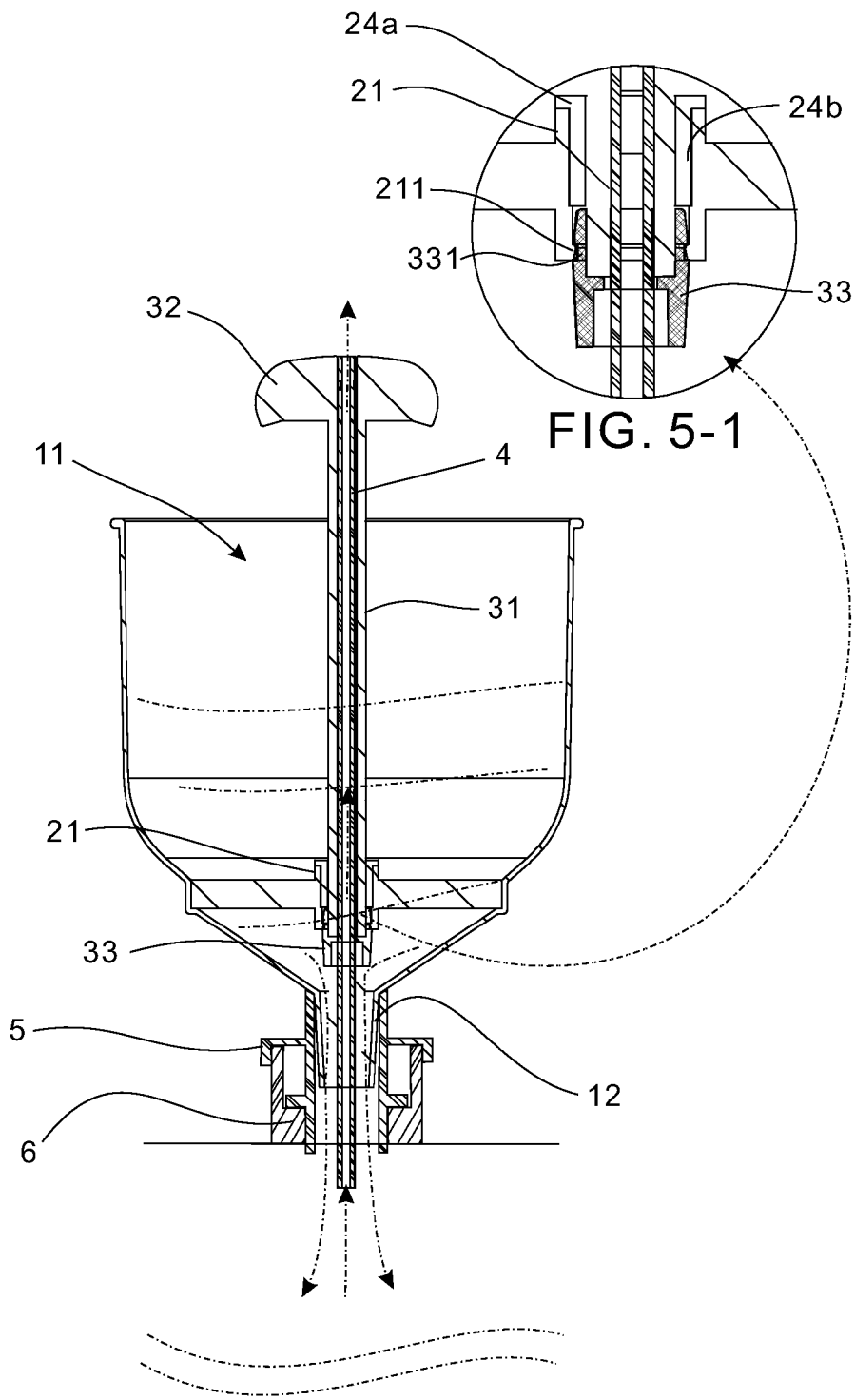
FIG. 5 is an example of the funnel apparatus operates in an open installment.

FIG. 5 shows an example for a embodiment of the present invention in its open state. In the open state, the fluid inside the receiving member 11 is introduced into the filling opening 6 of the radiator. The stopper 33 of the plunger rod 31 is pushed against the assembly bore portion 21. FIG. 5-1 provides an enlarged view detailing a portion of this limiting structure. An end of the perimeter defined by the inner diameter of the assembly bore portion 21 is disposed with extended fingers 211. The above-identified stopper 33 is disposed with a circular recessed groove 331. By way of the above, when the stopper 33 is fixe at the assembly bore 21, the extended fingers 211 of the assembly bore 21 works to push against the circular recessed groove 331. As a result, the passageway of the circular member 12 is presented to be in an open state. By the benefit of this structural design, the fluid can flow toward the tubular member 12 for exit, and from there the soft tube 4 that extends into the radiator can transfer the air therein for exit, to allow the fluid to be smoothly guided to enter the radiator.

In another aspect of the present invention, and in an effort to increase flexibility for the perimeter described by the inner diameter of the tubular member 12 to be adaptable for locking filling openings 6 of all sizes, there is further disposed an adaptor 5 with a matching opening diameter. The adaptor 5 has variable diameters, to help the funnel to be fixed in place and avoid disproportionate posture leading to fluid spillage. The adaptor 5 has a lid 51 and a tubular adaptor member 52. The outer diameter of the tubular adaptor member 52 thereof matches the inner diameter of the filling opening 6, and can be set to probe deeper into the opening diameter of the filling opening 6. The shape of the lid 51 is matching to the filling opening 6, and is configured to stretch over the outer perimeter of the filling opening 6.

Figure 6:
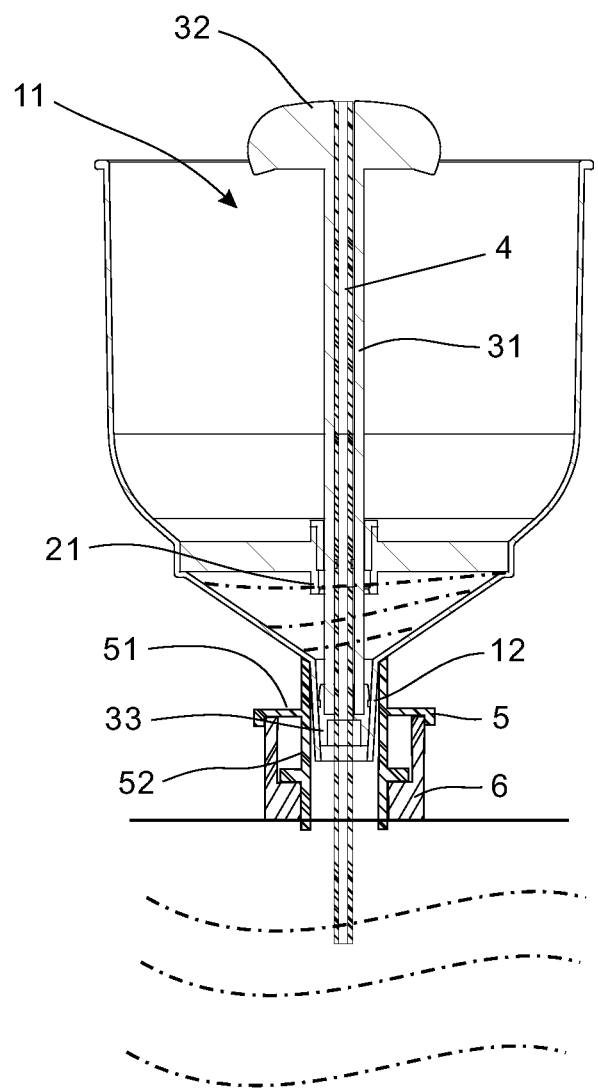
FIG. 6 shows an example for the situation when the funnel apparatus operates in a closed installment.

FIG. 6 shows an embodiment for the funnel apparatus of the present invention in its closed state. In this state, the tubular member 12 of the receiving member 11 is closed, and the fluid is stopped from being introduced into the filling opening 6 of the radiator. As shown by the figure thereof, the handle 32 of the plunger rod 31 is pressed downward in an axial direction to cause the stopper 33 from detach from the assembly bore portion 21. Further, the stopper 33 works to block the passageway of the tubular member 12. As a result of this, the passageway of the tubular member 12 is presented to in a closed state, and in this state, the fluid can be stopped from flowing toward the tubular member 12 for exit. The funnel 1 can be parted from the filling opening 6, and the remaining fluid can be retained inside the receiving member 11.

The above is only for the description of the preferred embodiments of the current invention, not for limiting the scope of the current invention. Any modifications, equivalent changes and improvements that are within the spirit and principles in the current invention should be included in the scope of protection of the current invention. In addition, the specific structure disclosed herein have only not been made in appearance in products of related kinds, neither have been published before the filing of this patent application. Having diligently fulfilled the requirements and conditions stipulated in the statute, the applicant hereby submits this application for patent and respectfully requests for timely examination.

What is claimed is:

1. A funnel apparatus for filling liquid into a filling opening, comprising:
   a funnel which comprises a receiving member and a tubular member extended downwardly from said receiving member for allowing liquid to flow therethrough, wherein one end of said receiving member defines a limiting portion surrounding an inner surface of said receiving member, wherein said tubular member has a passageway, a top portion, and a bottom portion, wherein said tubular member is arranged for being locked into said filling opening, wherein said passageway is configured to allow said fluid to flow into said filling opening therethrough;

a locking means fixedly locked on said limiting portion, wherein said locking means comprises an assembly bore portion having a bore, a rim and a plurality of spokes extended between said assembly bore portion and said rim;

a sealing means which comprises a plunger rod, a handle and a stopper, wherein said plunger rod has a plurality of recessed portions, a top end disposed with said handle, and a bottom end disposed with said stopper, wherein said tubular member of said funnel is blocked by said stopper;

a connecting hub disposed with said locking means, wherein said connecting hub comprises an extended lip defined at one end of said connecting hub and a tubing defined by another end of said connecting hub, wherein said extended lip is disposed against an end of said assembly bore portion, and said tubing is attached on an inner surface of said bore of said assembly bore portion, wherein said tubing of said connecting hub allows said bottom end of said plunger rod to pass therethrough; and an elastic tube, which is made of soft material, inserted through said recessed portions of said plunger rod and said stopper for extending into said filling opening, wherein another end of said assembly bore portion defines a plurality of extended fingers, and said stopper has a circular recessed groove provided thereon, wherein when said extended fingers of said assembly bore portion are pushed into said recessed groove of said stopper, said stopper is apart from said tubular member and said passageway of said tubular member is opened, and when said stopper is pressed to detach from said assembly bore portion, said stopper is capable of blocking said passageway of said tubular member.

2. The funnel apparatus, as recited in claim 1, wherein said plunger rod further has a plurality of slits formed respectively through said recessed portions of said plunger rod for enabling a user to check whether said elastic tube is congestion-free.

3. The funnel apparatus, as recited in claim 1, further comprising an adaptor, wherein said adaptor comprises a lid and a tubular adaptor member extended downwardly from said lid, wherein an outer diameter of said tubular adaptor member matches an inner diameter of said filling opening so as to enable said tubular adaptor member to be disposed within said filling opening, and a shape of said lid matches with said filling opening so as to enable said lid to be supported by said filling opening in position.

4. The funnel apparatus, as recited in claim 2, further comprising an adaptor, wherein said adaptor comprises a lid and a tubular adaptor member extended downwardly from said lid, wherein an outer diameter of said tubular adaptor member matches an inner diameter of said filling opening so as to enable said tubular adaptor member to be disposed within said filling opening, and a shape of said lid matches with said filling opening so as to enable said lid to be supported by said filling opening in position.

* * * * *